Oct. 6, 1964   J. R. CASSANO ETAL   3,152,290
ROTARY ELECTROMAGNET CONSTRUCTION
Filed June 6, 1962   2 Sheets-Sheet 1
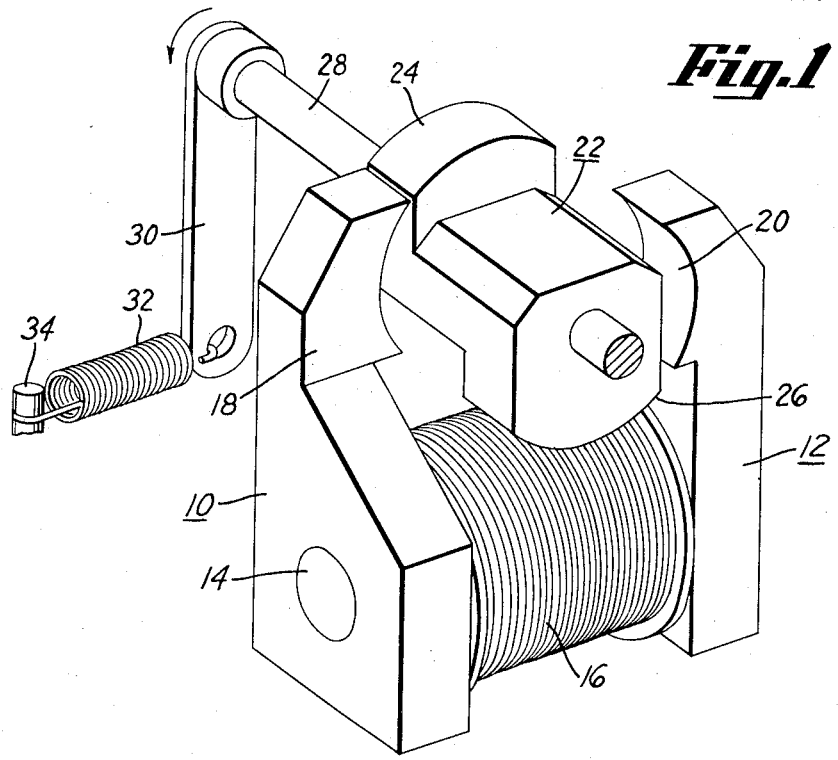
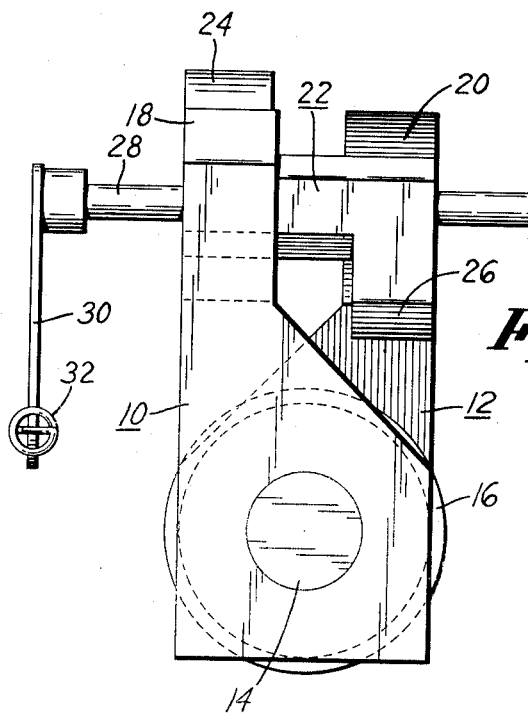
INVENTORS
JAMES R. CASSANO
WILLIAM E. FRITZ
BY
*W. E. Finken*
ATTORNEY Oct. 6, 1964  J. R. CASSANO ETAL  3,152,290
ROTARY ELECTROMAGNET CONSTRUCTION
Filed June 6, 1962  2 Sheets-Sheet 2
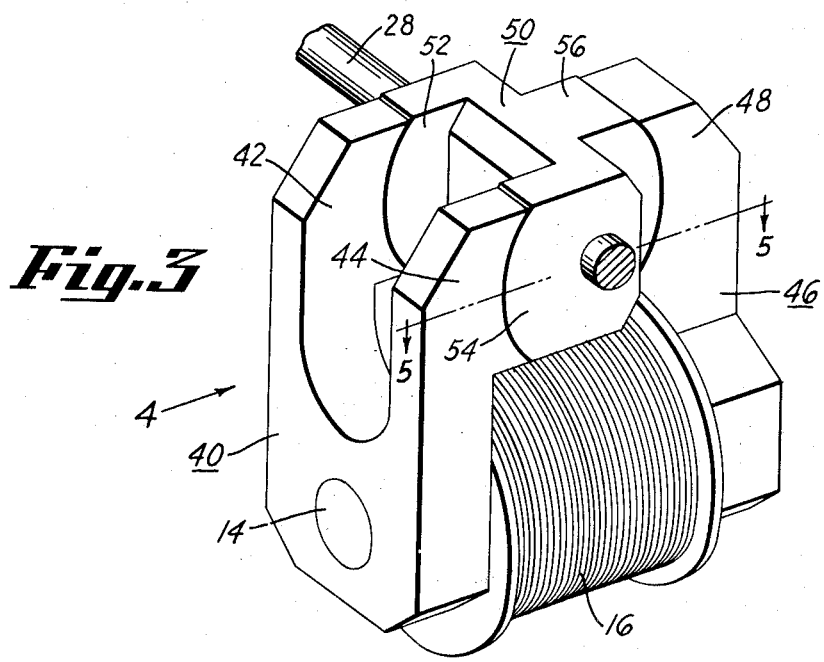
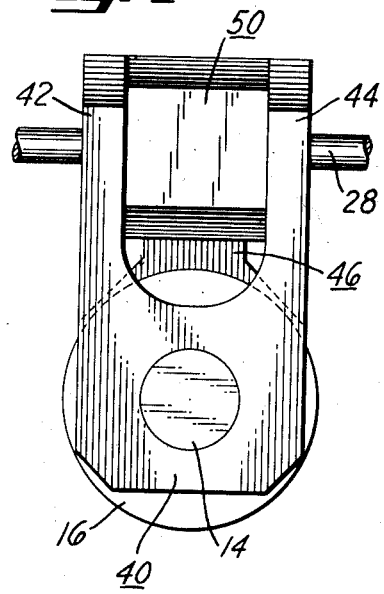
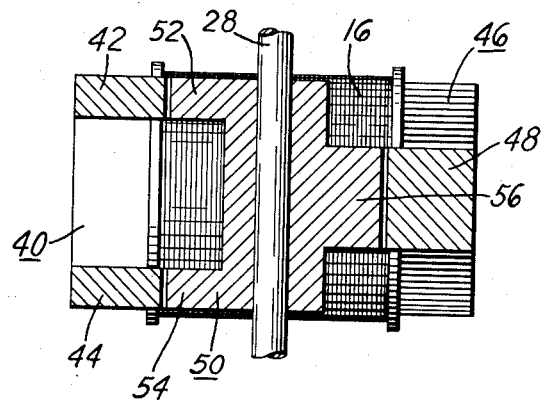
INVENTORS
JAMES R. CASSANO
WILLIAM E. FRITZ
BY
*W. E. Finken*
ATTORNEY United States Patent Office 3,152,290
Patented Oct. 6, 1964

3,152,290
ROTARY ELECTROMAGNET CONSTRUCTION
James R. Cassano and William E. Fritz, Rochester, N.Y., assignors to General Motors Corporation, Detroit, Mich., a corporation of Delaware
Filed June 6, 1962, Ser. No. 200,416
1 Claim. (Cl. 317—197)

This invention pertains to rotary electromagnets, and particularly to an improved rotary electromagnet construction having an extended range of useful angular movement.

Heretofore, it has been customary to construct rotary electromagnets by bearing mounting a rotor, comprising a bar of magnetic material with arcuate ends, between a pair of arcuate stator poles which are interconnected and carry an energizing winding. The arcuate ends of the rotor define an arcuate air gap with the stator poles, and the rotor is usually spring biased so that the arcuate ends of the rotor are displaced from the stator poles when the winding is deenergized. With this type of rotary electromagnet construction it is only possible to obtain a useful angular motion of approximately 60° since the torque exerted on the rotor decreases rapidly as the rotor becomes aligned with the poles and as the rotor approaches a 90° position from the poles.

The present invention relates to a rotary electromagnet construction wherein the stator poles are axially offset, as are the arcuate ends of the rotor, whereby the torques act in the same direction, rather than in opposite directions, on the rotor, when the rotor is positioned in quadrature, or at 90°, relative to the stator poles. In this manner the useful angular movement of the rotor can be increased to an angle exceeding 100°. Accordingly, among our objects are the provision of a large angular excursion rotary magnet construction; the further provision of a rotary electromagnet comprising a stator with axially offset poles and a rotor having complementary axially offset ends; and the still further provision of a rotary electromagnet of the aforesaid type including means for equalizing the bearing loads.

The aforementioned and other objects are accomplished in the present invention by arranging the stator and rotor so that the magnetic forces produce a torque couple on the rotor when the ends of the rotor have a quadrature relation with the stator poles. Specifically, two embodiments of improved rotary electromagnets are disclosed herein. In one embodiment the rotary electromagnet comprises a bearing mounted shaft having a rotor with a substantially Z-shaped cross-section attached thereto whereby the arcuate ends of the rotor are located in axially spaced, parallel planes. The stator comprises a pair of pole pieces having complementary axially offset pole shoes, the pole pieces being interconnected by a core which supports a coil.

In the preferred embodiment the rotor is likewise attached to a bearing mounted shaft, but is provided with a pair of axially spaced legs constituting one set of pole tips, and an intermediate oppositely extending leg constituting the other pole tip. The stator comprises one pole piece having a pair of axially spaced pole shoes coacting with the axially spaced legs of the rotor, and a second pole piece having a single pole shoe coacting with the oppositely extending leg of the rotor. The two pole pieces are again interconnected by a core which supports an energizing coil. In the second embodiment the bearing loads are equalized.

Further objects and advantages of the present invention will be apparent from the following description, reference being had to the accompanying drawings, wherein preferred embodiments of the present invention are clearly shown.

In the drawings:
FIGURE 1 is a perspective view of a rotary electromagnet constructed according to one embodiment of this invention.
FIGURE 2 is a side view of the rotary electromagnet shown in FIGURE 1.
FIGURE 3 is a perspective view of a rotary electromagnet constructed according to the second embodiment of this invention.
FIGURE 4 is a side view of FIGURE 3 taken in the direction of arrow 4.
FIGURE 5 is a sectional view taken along line 5—5 of FIGURE 3.

As alluded to hereinbefore, in conventional rotary electromagnets such as the type shown in copending application Serial No. 780,614 filed December 15, 1958, now Patent No. 3,054,426 wherein the stator poles are located diametrically opposite each other and coact with a bar-type rotor having arcuate ends, the rotor cannot be positioned so as to have a quadrature relation with the stator poles when the winding is deenergized. This is true since if the rotor has a quadrature position relative to the stator poles, upon energization of the winding, the magnetic forces produce equal torques which act on the rotor in opposite directions. Therefore, it is necessary with conventional rotary electromagnets to angularly orient the rotor so that the magnetic forces produce a torque couple when the coil is energized. In practical application it has been found that in order to achieve this result the rotor must be oriented at an angle of substantially 75° from alignment with the stator poles when the coil is deenergized. Moreover, since the torque exerted on the rotor decreased rapidly as the ends of the rotor approach alignment with the stator poles, the useful angular motion of a conventional rotary magnet is limited to about 60°.

Referring to FIGURES 1 and 2, the first embodiment of the improved large excursion rotary electromagnet includes a stator comprising a pair of pole pieces 10 and 12 preferably composed of sintered iron powder. The pole pieces 10 and 12 are held in spaced relation by a core 14 which supports an energizing coil 16. The pole 10 is formed with an arcuate pole shoe 18, and the pole piece 12 is formed with an arcuate pole shoe 20, the pole shoes 18 and 20 being axially offset with respect to each other. The rotor comprises an armature 22, preferably of sintered iron powder having the desired magnetic properties, having complementary axially offset arcuate ends 24 and 26. In cross-section the rotor 22 is substantially Z-shaped, the rotor 22 being attached to a shaft 28 which is coaxially arranged with respect to the stator poles. The shaft 28 is supported in suitable bearings, not shown, and has a crank arm 30 attached thereto. One end of a coil spring 32 is attached to the crank arm 30 and the other end of the coil spring is attached to a fixed support 34, so that the arcuate ends 24 and 26 of the rotor have a quadrature relation with the pole pieces 18 and 20 when the coil 16 is deenergized and the crank arm 30 is held in engagement with a stop, not shown.

The arcuate end 24 of the armature 22 defines an arcuate air gap with the pole shoe 18, and the arcuate end 26 of the armature likewise defines an arcuate air gap with the pole shoe 20. Since the arcuate ends 24 and 26 of the armature 22 are axially offset, as are the pole shoes 18 and 20 of the stator, it will be appreciated that upon energization of the coil 16 the magnetic forces will produce a torque couple tending to rotate the armature 24 and its shaft 28 in the counterclockwise direction as viewed in FIGURE 1. Thus, the rotor can be located in quadrature relation to the stator poles when the coil is deenergized, and in fact, the rotor can actually be oriented at an angle greater than 90° relative to the stator poles.

In this manner the useful angular motion of the rotor can be increased to an angle exceeding 100°.

One of the inherent problems associated with the rotary magnet construction shown in FIGURES 1 and 2 is that of unequal bearing loads caused by attraction between the offset ends of the rotor and the offset pole shoes of the stator. In the preferred embodiment of the present invention, as shown in FIGURES 3 through 5, the bearing loads are equalized. Thus, in the second embodiment the stator comprises a pole piece 40 having a pair of axially spaced arcuate pole shoes 42 and 44, and a pole piece 46 having a single pole shoe 48 aligned with the space between the pole shoes 42 and 44 and the pole piece 40. The pole pieces 40 and 46 are interconnected by a core 14 which supports the energizing coil 16. The rotor includes a shaft 28 and an armature 50 attached thereto, the armature 50 having a pair of spaced legs 52 and 54 with arcuate ends coacting with the pole shoes 42 and 44 and defining arcuate air gaps therewith. In addition, the armature 50 has a leg 56 with an arcuate end defining an arcuate air gap with the pole shoe 48.

It will be appreciated that in the rotary magnet of the second embodiment the bearing loads on the shaft 28 will be equalized since the magnetic forces acting on the rotor will not tend to cant the shaft 28 in either direction. The angular excursion of the rotor and the rotor magnet shown in FIGURES 3 through 5 can, likewise, approach 100°, since the rotor can be angularly oriented so that the arcuate ends thereof are more than 90° from their complementary stator pole shoes and yet be subjected to a torque couple upon energization of the coil 16. Moreover, the rotor of both embodiments can be moved to a position where the arcuate ends thereof are in alignment with their complementary pole shoes of the stator without any appreciable loss of torque.

While the embodiments of the invention as herein disclosed constitute preferred forms, it is to be understood that other forms might be adopted.

What is claimed is as follows:

A rotary electromagnet including, a stator comprising a first pole piece having a pair of axially spaced arcuate pole shoes, a second pole piece having a single arcuate pole shoe aligned with the space between the arcuate pole shoes on said first pole piece, a core interconnecting said pole pieces and an energizing coil supported by said core, and a rotor having a pair of axially spaced arcuate end portions coacting with the axially spaced pole shoes of said first pole piece and an oppositely extending arcuate end portion coacting with the pole shoe of said second pole piece, said rotor being subjected to a torque couple upon energization of said coil when the arcuate end portions thereof have a quadrature relation with said pole shoes.

References Cited in the file of this patent

UNITED STATES PATENTS

| | | |
|---|---|---|
| 827,270 | Struble | July 31, 1906 |
| 1,215,508 | Dunham | Feb. 13, 1917 |
| 1,386,231 | Billon | Aug. 2, 1921 |